United States Patent
Chen et al.

(10) Patent No.: US 11,250,267 B2
(45) Date of Patent: Feb. 15, 2022

(54) METHOD AND APPARATUS FOR PROCESSING INFORMATION ASSOCIATED WITH VIDEO, ELECTRONIC DEVICE, AND STORAGE MEDIUM

(71) Applicant: BEIJING BYTEDANCE NETWORK TECHNOLOGY CO., LTD., Beijing (CN)

(72) Inventors: Dawei Chen, Beijing (CN); Bao Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/980,700

(22) PCT Filed: Apr. 8, 2019

(86) PCT No.: PCT/CN2019/081685
§ 371 (c)(1),
(2) Date: Sep. 14, 2020

(87) PCT Pub. No.: WO2020/007083
PCT Pub. Date: Jan. 9, 2020

(65) Prior Publication Data
US 2021/0365688 A1    Nov. 25, 2021

(30) Foreign Application Priority Data
Jul. 4, 2018    (CN) .......................... 201810726043.6

(51) Int. Cl.
*H04N 9/80* (2006.01)
*G06K 9/00* (2022.01)
(Continued)

(52) U.S. Cl.
CPC ....... *G06K 9/00765* (2013.01); *G06F 16/732* (2019.01); *G06F 16/7834* (2019.01); *G06F 16/7867* (2019.01)

(58) Field of Classification Search
CPC .............. G06K 9/00765; G06F 16/732; G06F 16/7834; G06F 16/7867
(Continued)

(56) References Cited

U.S. PATENT DOCUMENTS 9,367,985 B2 *   6/2016   Dempsey ............ G07F 17/3227
10,373,272 B2 *  8/2019   Ryan ....................... H04L 63/08
(Continued)

FOREIGN PATENT DOCUMENTS

| CN | 102222103 A | 10/2011 |
|----|-------------|---------|
| CN | 104756503 A | 7/2015  |

(Continued)

OTHER PUBLICATIONS

Notice of Allowance dated Mar. 23, 2021 for Chinese Patent Application No. 201810726043.6.
(Continued)

*Primary Examiner* — Robert Chevalier
(74) *Attorney, Agent, or Firm* — Thomas Horstemeyer, LLP

(57) ABSTRACT

Provided is a method for processing information associated with video. The method includes: storing an association relationship between identification information of a first video and identification information of a second video, the two videos including a same video content segment; receiving a video query request message; in a case where the video query request message includes the identification information of the first video, acquiring and returning the identification information of the second video associated with the identification information of the first video; or in a case
(Continued)

where the video query request message includes the identification information of the second video, acquiring and returning the identification information of the first video associated with the identification information of the second video. Further provided are an apparatus for processing information associated with video, a method and an apparatus for querying information associated with video, an electronic device, and a storage medium.

20 Claims, 4 Drawing Sheets

(51) Int. Cl.
  *G06F 16/732* (2019.01)
  *G06F 16/783* (2019.01)
  *G06F 16/78* (2019.01)

(58) Field of Classification Search
  USPC ............... 386/241, 243, 248, 249, 250, 326
  See application file for complete search history.

(56) References Cited

U.S. PATENT DOCUMENTS

| | | | |
|---|---|---|---|
| 10,552,819 B1* | 2/2020 | Gupta | ............... G06Q 20/3272 |
| 2014/0067858 A1 | 3/2014 | Jacobson et al. | |
| 2014/0165082 A1* | 6/2014 | Chen | ............... H04N 21/41407 |
| | | | 725/4 |
| 2015/0063781 A1 | 3/2015 | Silverman et al. | |
| 2017/0300570 A1 | 10/2017 | Chiarandini et al. | |

FOREIGN PATENT DOCUMENTS

| | | |
|---|---|---|
| CN | 106162351 A | 11/2016 |
| CN | 106686441 A | 5/2017 |
| CN | 107609149 A | 1/2018 |
| CN | 107968952 A | 4/2018 |
| WO | 2017180199 A1 | 10/2017 |

OTHER PUBLICATIONS

Supplementary Search Report dated Mar. 11, 2021 for Chinese Patent Application No. 201810726043.6.
Luo, Li; et al. (2015) "Study of Association and Aggregation of Video Content Based on Fusion Media" TV Center.
International Search Report and Written Opinion dated Jun. 28, 2019 for PCT Patent Application PCT/CN2019/081685.
1st Search Report dated Aug. 10, 2020 for Chinese Patent Application No. 201810726043.6.
1st Office Action dated Aug. 19, 2020 for Chinese Patent Application No. 201810726043.6.

* cited by examiner

METHOD AND APPARATUS FOR PROCESSING INFORMATION ASSOCIATED WITH VIDEO, ELECTRONIC DEVICE, AND STORAGE MEDIUM

CROSS-REFERENCE TO RELATED APPLICATIONS

This application is a National Stage Application, filed under 35 U.S.C. 371, of International Patent Application No. PCT/CN2019/081685, filed on Apr. 8, 2019, which claims priority to a Chinese patent application No. 201810726043.6 filed with CNIPA on Jul. 4, 2018, contents of both of which are incorporated herein by reference in their entireties.

TECHNICAL FIELD

Embodiments of the present disclosure relate to the technical field of video processing, and for example, to a method and an apparatus for processing information associated with video, an electronic device, and a storage medium.

BACKGROUND

With the development of the Internet and smart terminals, various video services enrich life, work and entertainment of users.

In the related art, in a case of playing a video for a user by using a video playing device (e.g., a smart television, a mobile phone), a scenario for determining an associated video usually exists. However, in the related art, other videos related to a video are usually determined according to a name or a tag of the video. However, the name or the tag of the video is usually determined by the user who uploads the video, and due to user habits and other reasons, the name or the tag of the video has a large difference, it is impossible to accurately and comprehensively determine the other videos related to the video according to the name or the tag of the video.

SUMMARY

Embodiments of the present disclosure provide a method and an apparatus for processing information associated with video, an electronic device, and a storage medium, so that when video association is performed, an association relationship between videos can be accurately and comprehensively reflected.

In an embodiment, the present disclosure provides a method for processing information associated with video, which includes steps described below.

An association relationship between identification information of a first video and identification information of a second video is stored, where the first video and the second video include a same video content segment;

a video query request message is sent, where the video query request message includes identification information of a first video or identification information of a second video; and in a case where the video query request message includes the identification information of the first video, the identification information of the second video associated with the identification information of the first video is acquired, and a video query response message including the identification information of the second video is returned; or in a case where the video query request message includes the identification information of the second video, the identification information of the first video associated with the identification information of the second video is acquired, and a video query response message including the identification information of the first video is returned.

In an embodiment, the present disclosure provides a method for querying information associated with video, which includes steps described below.

A video query request message is sent, where the video query request message includes identification information of a first video or identification information of a second video; and a video query response message is received, where in a case where the video query request message includes the identification information of the first video, the video query response message includes the identification information of the second video associated with the identification information of the first video, or in a case where the video query request message includes the identification information of the second video, the video query response message includes the identification information of the first video associated with the identification information of the second video, and the first video and the second video includes a same video content segment.

In an embodiment, the present disclosure provides an apparatus for processing information associated with video, which includes a storage module, a receiving module, and a sending module.

The storage module is configured to store an association relationship between identification information of a first video and identification information of a second video, where the first video and the second video include a same video content segment;

the receiving module is configured to receive a video query request message, where the video query request message includes the identification information of the first video or the identification information of the second video; and the sending module is configured to: in a case where the video query request message includes the identification information of the first video, acquire the identification information of the second video associated with the identification information of the first video, and return a video query response message including the identification information of the second video; or in a case where the video query request message includes the identification information of the second video, acquire the identification information of the first video associated with the identification information of the second video, and return a video query response message including the identification information of the first video.

In an embodiment, the present disclosure provides an apparatus for querying information associated with video, which includes a sending module, and a receiving module.

The sending module is configured to send a video query request message, where the video query request message includes identification information of a first video or identification information of a second video; and the receiving module is configured to receive a video query response message, where in a case where the video query request message includes the identification information of the first video, the video query response message includes the identification information of the second video associated with the identification information of the first video, or in a case where the video query request message includes the identification information of the second video, the video query response message includes the identification information of the first video associated with the identification information of the second video, and the first video and the second video include a same video content segment.

In an embodiment, the present disclosure further provides a system for querying information associated with video, which includes the apparatus for processing information associated with video described in the mentioned-above embodiment, and the apparatus for querying information associated with video described in the mentioned-above embodiment.

In an embodiment, the present disclosure further provides an electronic device. The electronic device includes at least one processor, and a memory, which is configured to store at least one program;

the at least one program, when executed by the at least one processor, makes the at least one processor to implement the method for processing information associated with video described in the mentioned-above embodiment, and/or, implement the method for querying information associated with video described in the mentioned-above embodiment.

In an embodiment, the present disclosure further provides a computer-readable storage medium for storing a computer program, which, when executed by a processor, implements the method for processing information associated with video described in the mentioned-above embodiment, and/or, implements the method for querying information associated with video described in the mentioned-above embodiment.

DETAILED DESCRIPTION

Figure 1:
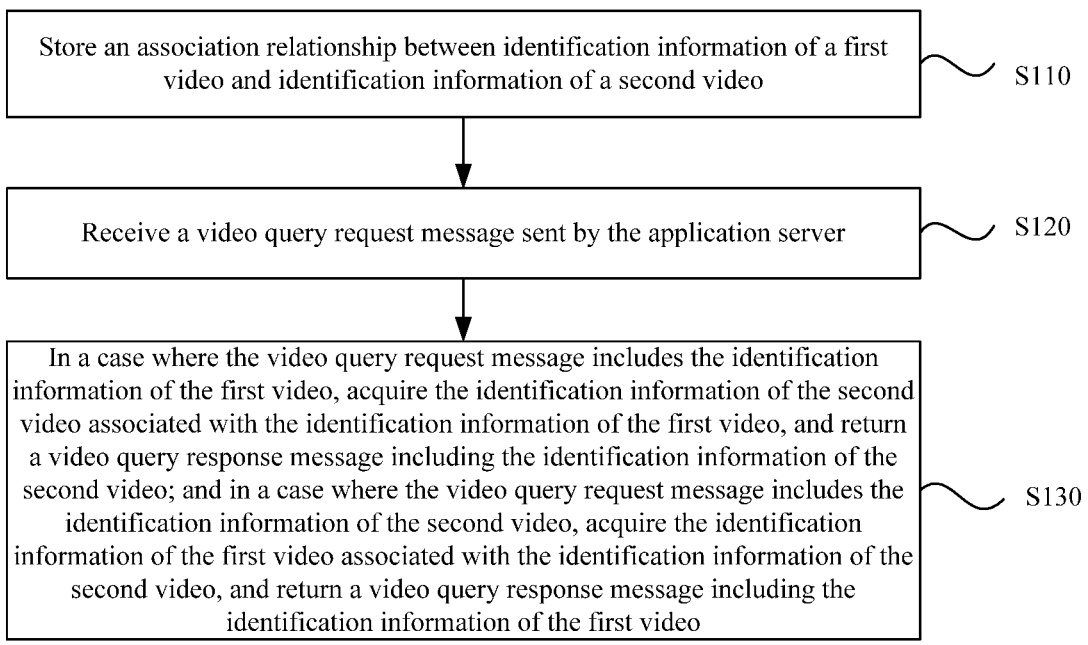
FIG. 1 is a flowchart of a method for processing information associated with video according to an embodiment of the present disclosure.

The present disclosure will be described below in conjunction with the drawings and embodiments. The detailed description of the embodiments set forth below is intended to explain and not to limit the present disclosure. For ease of description, only part, not all, of structures related to the present disclosure are illustrated in the drawings.

The embodiments of the present disclosure provide a method and an apparatus for processing information associated with video, an electronic device and a storage medium, which can establish a video association relationship based on same video content, optimize a video association manner, and make a video association result more accurate and flexible.

The terms "system" and "network" are often used interchangeably herein in the present disclosure. Reference to "and/or" in the embodiments of the present disclosure is meant to include any and all combinations of one or more of the associated listed items. The terms "first", "second" and the like in the specification, claims and drawings of the present disclosure are used to distinguish between similar objects and are not used to describe a particular order or sequence.

The following embodiments of the present disclosure may be implemented individually, or in combination with each other, and the embodiments of the present disclosure are not limited in this respect.

The embodiments of the present disclosure may be applied to application scenarios for implementing video association. The scenarios may include: a terminal device (such as a smart television, a mobile phone) capable of playing video, a server, or a terminal device and a server. The server may include an application server providing support for the terminal device, a storage server storing video resources, and an association relationship server storing video association relationships. The storage server and the association relationship server respectively provide service interfaces for the application server, so that the application server can respond to one or more instructions input by a user through the terminal device. In practical applications, the storage server and the association relationship server may be integrated into one server device, or may be separately configured in different server devices; or the association relationship server and the application server may be integrated into a same server device, or may be separately configured in different server devices, which is not limited in the embodiments of the present disclosure. The embodiments of the present disclosure may be implemented in a storage side device for storing association relationships between identification information of a first video and identification information of a second video, and a query side device for querying the association relationships. According to a difference in storage positions of the association relationships, the storage side device and the query side device may be an association relationship server and an application server respectively, or the storage side device and the query side device may be a database module of the application server and a play control module of the application server respectively, which is also only for description and is not limited.

Embodiment 1

FIG. 1 is a flowchart of a method for processing information associated with video according to an embodiment of the present disclosure. The method is executed on a storage side device, and as show in FIG. 1, the method includes steps S110 to S130.

In step S110, an association relationship between identification information of a first video and identification information of a second video is stored.

In an embodiment, the association relationship server stores the association relationship between the identification information of the first video and the identification information of the second video in the storage module.

The first video and the second video include a same video content segment.

In an embodiment, the first video and the second video include the same video content segment, which means that a video content segment of a certain time length included in the first video is also included in the second video, for example, each of the first video and the second video is a segment of a television series, the first video includes a video content segment of an episode, and the second video includes entire video content of the episode; or, each of the first video and the second video is a segment of one television series, the first video includes a video content segment of an M-th episode and a video content segment of an N-th episode, and the second video includes entire video content of the M-th episode, which is not limited in this embodiment as long as the first video and the second video include a same video content segment.

In an embodiment, the association relationship server may acquire the identification information of the first video and the identification information of the second video in multiple manners, which will be described in the following embodiments, and the storage module stores the association relationship between the identification information of the first video and the identification information of the second video.

After the association relationship server acquires the association relationship between the identification information of the first video and the identification information of the second video, the association relationship server stores the association relationship between the identification information of the first video and the identification information of the second video in the storage module.

In an embodiment, the association relationship between the identification information of the first video and the identification information of the second video may be stored in a same storage module or in different storage modules.

If the acquired association relationship between the identification information of the first video and the identification information of the second video is stored in a same storage module, when the association relationship between the identification information of the first video and the identification information of the second video is stored, a data fusion operation may be used for storing the association relationship between the identification information of the first video and the identification information of the second video in a predetermined format.

If the acquired association relationship between the identification information of the first video and the identification information of the second video is stored in different storage modules, different query interfaces may be respectively provided for the different storage modules to perform query. For the association relationship server, a uniform external service interface may be set according to a requirement to execute steps S120 and S130 described below, but when the association relationship server performs query internally, the query may be performed through different query interfaces. In an embodiment, the association relationship server may provide external service interfaces through different storage modules.

In step S120, the association relationship server receives a video query request message.

The video query request message includes the identification information of the first video or the identification information of the second video.

In an embodiment, the video query request message may be initiated when the application server or the terminal device needs to acquire an association relationship between videos according to a service requirement, for example, when the application server detects that a terminal device is playing a first video, in order to meet a demand of a user for another video associated with the first video, the application server may push another video associated with the first video to the terminal device, so that the user may select the associated another video to play, thereby providing a better viewing experience for the user; in this case, the application server may send a video query request message to the association relationship server, and the video query request message includes an identification message of the first video. In addition, if the application server need to query for other videos associated with the second video, the identification information of the second video may be included in the video query request message.

In step S130, in a case where the video query request message includes the identification information of the first video, the identification information of the second video associated with the identification information of the first video is acquired, and a video query response message including the identification information of the second video is returned; or in a case where the video query request message includes the identification information of the second video, the identification information of the first video associated with the identification information of the second video is acquired, and a video query response message including the identification information of the first video is returned.

As known from step S110 described above, the association relationship between the identification information of the first video and the identification information of the second video has been stored in the storage module of the association relationship server; therefore, after the video query request message including the identification information of the first video is received, the corresponding identification information of the second video associated with the identification information of the first video may be acquired from the storage module. Similarly, because the association relationship between the identification information of the first video and the identification information of the second video is established, in addition to acquisition of the identification information of the second video according to the identification information of the first video, the identification information of the first video may also be acquired according to the identification information of the second video, that is, if the video query request message includes the identification information of the second video, the association relationship server acquires the associated identification information of the first video in the storage module, and returns the video query response message including the identification information of the first video to the application server.

In step S120 described above, the application server initiates a video query request in a case of sending situation of other videos associated with the first video which is currently displayed to the terminal device, and after receiving the identification information of the second video associated with the identification information of the first video, the application server may push prompt information of playing the second video to the terminal device, so as to be selected by the user.

In the embodiment shown in FIG. 1, the description is given by taking an example of storing the identification information of the first video and the identification information of the second video in the association relationship server; but actually, those skilled in the art may also store the mentioned-above association relationship in a database of the application server, the method may be executed between the play control module and the database module inside the application server, that is, the play control module initiates the video query request message, and the database module feeds back the video query response message, and the association relationship may be generated on other devices, and at a certain time, for example, when the first video or the second video is published, the above-mentioned association relationship is stored in the database of the application server.

According to the present disclosure, an association relationship between videos is determined based on a same video content, so that after receiving a video query request message sent by an application server, a video query response message including the identification information of the second video associated with the identification information of the first video or the identification information of the first video associated with the identification information of the second video is sent to the application server.

Compared with determination of the association relationship between videos by names of the videos in the related art, in the present disclosure, the association relationship between videos can be reflected more accurately and comprehensively, so that the application server can provide the associated video more accurately and comprehensively.

Embodiment 2

Figure 2:
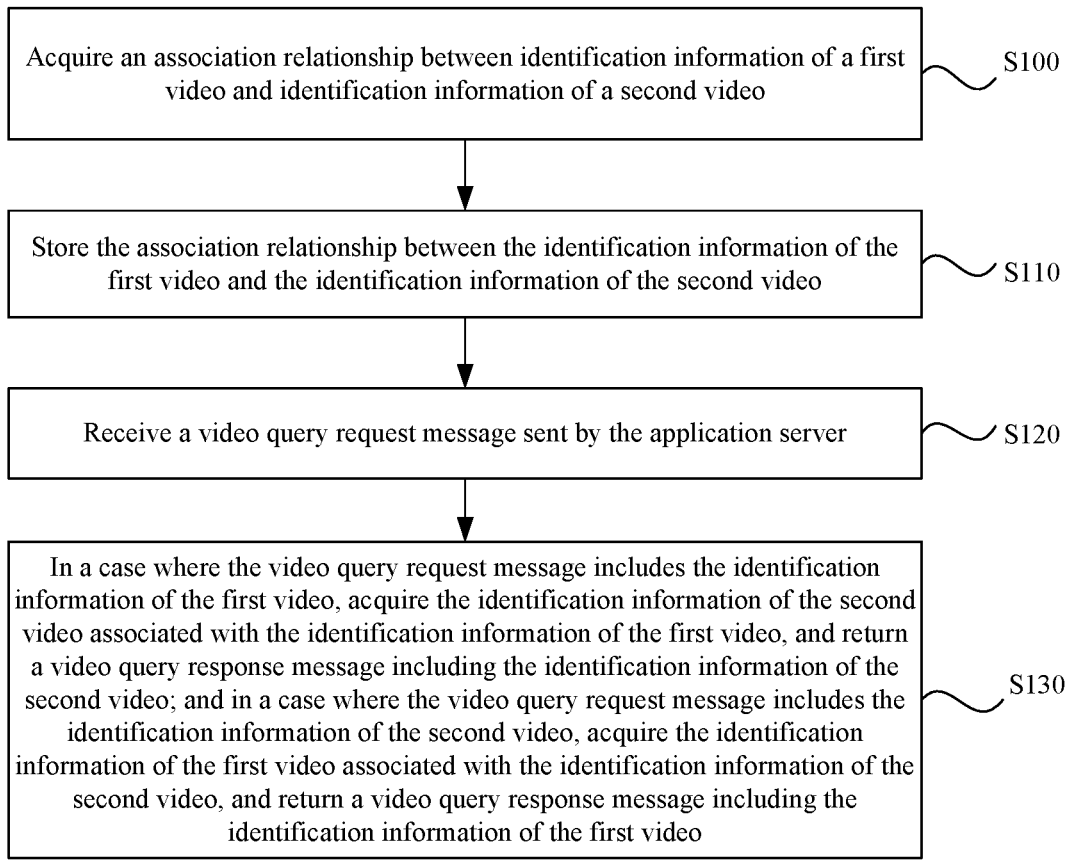
FIG. 2 is a flowchart of another method for processing information associated with video according to an embodiment of the present disclosure.

In an embodiment, in conjunction with FIG. 1, FIG. 2 is a flowchart of another method for processing information associated with video according to an embodiment of the present disclosure, that is, the method further includes step S100 before step S110.

In S100, the association relationship server acquires the association relationship between the identification information of the first video and the identification information of the second video.

In an embodiment, in this step, the association relationship between the identification information of the first video and the identification information of the second video may be established in the association relationship server, or may be formed on another device or by manual operation input, and in this step, it is equivalent to that the association relationship server acquires from another device or an input device. In an embodiment, the association relationship between the identification information of the first video and the identification information of the second video is acquired by any one or more of possible implementation manners described below.

In a first implementation manner, according to a video content analysis result of at least two videos, two videos including a same video content segment are taken as the first video and the second video respectively, and the association relationship between the identification information of the first video and the identification information of the second video is acquired. In an embodiment, the method is to provide a separate video content analysis device, the video content analysis device may analyze video content of at least two videos, obtains and take two videos including a same video content segment as a first video and a second video respectively, so as to acquire an association relationship between the identification information of the first video and the identification information of the second video; and after acquiring the association relationship between the identification information of the first video and the identification information of the second video, the video content analysis device may send the association relationship to the association relationship server, so that the association relationship server acquires the association relationship.

Exemplarily, taking a first video, a second video and a third video as an example, the video content analysis device analyzes video content of the first video, the second video and the third video to obtain that the first video and the second video include a same video content segment, the first video and the third video do not include a same video content segment, and the second video and the third video do not include a same video content segment, so that the video content analysis device establishes and stores the association relationship between the identification information of the first video and the identification information of the second video, and sends the association relationship between the identification information of the first video and the identification information of the second video to the association relationship server.

In an embodiment, the above analysis of the at least two video content to obtain the same video content segment may include: frame extraction is performed on each video to be analyzed to obtain multiple frame images, and then multiple types of image features of each frame image are extracted, where the types of the image features are not limited, and at this time, multiple image features capable of characterizing the image may be obtained; then, a video feature of each video to be analyzed is determined according to image features of a same type of the multiple frame images of the video to be analyzed, for example, the image features may be arranged according to the sequence of the corresponding frame images in each video to obtain the video feature, and multiple types of video features are obtained in this way; and finally, sequence comparison is performed on the videos to be analyzed according to the obtained types of video features to obtain similarity of the video to be analyzed, a threshold value is set for the similarity, and it is considered that the two videos to be analyzed include a same video content segment only when the similarity is greater than a preset threshold.

In a second implementation manner, the second video is segmented through video segmentation to acquire the first video, and the association relationship between the identification information of the first video and the identification information of the second video is acquired. In this implementation manner, a video segmenting device may be provided; the video segmenting device performs the video segmentation, i.e., segments the second video to acquire the first video. The first video and the second video inevitably include a same video content segment because the first video is a part of the second video. At this time, the association relationship between the identification information of the first video and the identification information of the second video may be established during the segmentation, and the video segmenting device may send the association relationship to the association relationship server, so that the association relationship server acquires the association relationship.

Exemplarily, taking that the second video is a movie A as an example, after entire video content of movie A is acquired, in order to meet different playing requirements of a user, the segmenting devices may segment a highlight video part of the second video to acquire the first video. Therefore, the first video and the second video inevitably include a same video content segment, and the association relationship between the identification information of the first video and the identification information of the second video may be directly acquired during the segmentation, and sent to the association relationship server.

In a third implementation manner, the association relationship between the identification information of the first video and the identification information of the second video may be acquired. For example, when a video uploading user uploads a video, an association relationship between the uploaded video and an existing video resource may be input meanwhile. For example, when a copyright owner of a movie A promotes the movie A, it is often necessary to excerpt a highlight part of highlights for promotion, and the highlight are also a part of video content segments of the entire movie A. When the copyright owner of the movie A uploads a promotion video, the association relationship between the identification information of the promotion video and the identification information of the movie A may be input at the same time.

In a fourth implementation manner, the association relationship may be acquired through a video association relationship list. In an embodiment, the association relationship list may be formed on other devices, for example, the association relationship list may be formed and stored on the video segmenting device; or, the association relationship list may be an association relationship list plotted manually after a large number of videos are watched manually and video content are known; or, the association relationship list may be directly acquired through a partner. After the association relationship list is provided to the association relationship server, the association relationship server acquires the association relationship.

In above step S100 the present disclosure, description is given by taking an example in which the step is executed by the association relationship server. For a case where the association relationship is stored in the database module of the application server, the step may also be executed by the database module of the application server may. According to the present disclosure, the association relationship between videos is determined based on similarities and differences of the video content, the association relationship between the first video and the second video including a same video content segment is stored in the storage module, the association relationship may be established in multiple manners: the association relationship may be input by other independent devices or manual operation, or a corresponding association relationship establishment function may be integrated in the association relationship server, which is not limited in the present disclosure, and the above embodiment is also only an exemplary description. When an application server or a terminal device needs to acquires the above-mentioned association relationship because of service needs, the application server or the terminal device may send a video query request message carrying identification information of any associated video to query and acquire identification information of another associated video. In addition, in this embodiment, the first video and the second video are used as an example to describe the association relationship. However, in the actual association relationship, the identification information of the first video may also be associated with the identification information of multiple second videos, and the identification information of the second video may also be associated with the identification information of multiple first videos, that is, in addition to the one-to-one relationship, one-to-multiple and multiple-to-multiple association relationships may also exist.

In the embodiments shown in FIG. 1 and FIG. 2, the association relationship between the identification information of the first video and the identification information of the second video is stored in the storage module; however, since the first video and the second video include the same video content segment, the association relationship exists among the first video, the second video and the same video content segment in terms of time or video content; in this way, according to a certain playing progress in the same video content segment, corresponding positon of the certain playing progress in the first video and/or the second video may be determined, that is, positioning information between each other may be stored in the association relationship server, so that the association relationship server can provide more abundant services.

In an embodiment, in step S110 described above, the positioning information of the same video content segment in the first video may be further stored in the storage module, and the positioning information may be synchronously recorded when the association relationship is generated in above step S100; or the positioning information of the same video content segment in the second video is stored in the storage module; or, the positioning information of the same video content segment in the first video and the positioning information of the same video content segment in the second video are stored in the storage module.

In an embodiment, the positioning information described above includes at least one of: timestamp information, video frame information, or audio frame information. In an embodiment, the positioning information may also be any other information capable of implementing a positioning operation, which is not specifically limited in the present disclosure.

In an embodiment, the timestamp information includes a time association between the same video content segment and the first video and/or the second video; the timestamp information at least includes reference time of the same video content segment in the first video and/or the second video, where the reference time may be starting time or ending time of the video or another time point which may be used as a reference; that is, when the same video content segment starts in the first video and/or the second video, for example, the length of the second video is 30 minutes, the length of the same video content segment is 2 minutes, and the same video content segment starts from the 15th minute in the second video. Exemplarily, the length of the first video may be 20 minutes, and the same video content segment starts from the 10th minute in the first video. In the embodiment of the present disclosure, there is a special case in which the same video content segment is the entire content segment of the first video, for example, the length of the same video content segment is 2 minutes, and the length of the first video is also 2 minutes, and exemplarily, the same video content segment starts from the 15th minute of the second video.

As an important component of the video content, video frames may also characterize positions of the same video content segment in the first video and the second video; the video frame information at least includes a reference video frame of the first video and/or the second video for the same video content segment, where the reference video frame may be a starting video frame, an ending video frame, or another video frame which can be used as a reference of the video frames; for example, a total number of video frames of the second video is a positive integer M, a total number of video frames of the same video content segment is a positive integer N, N is smaller than or equal to M, and the same video content segment starts from an I-th frame in the second video, where I is a positive integer.

In an embodiment, the total number of video frames of the first video may be a positive integer L, and the same video content segment starts from a J-th frame in the first video, where J is a positive integer. In the embodiment of the present disclosure, there is a special case in which the same video content segment is the entire content segment of the first video, for example, the length of the same video content segment is 2 minutes, and the length of the first video is also 2 minutes, and exemplarily, the same video content segment starts from the 15th minute of the second video.

As an important component of the video content, audio frames may also characterize positions of the same video content segment in the first video and the second video; the audio frame information includes a reference audio frame of the first video and/or the second video for the same video content segment, where the reference audio frame may be a starting audio frame or an ending audio frame or another audio frame which can be used as a reference of an audio frame; for example, a total number of audio frames of the second video is a positive integer M, a total number of audio frames of the same video content segment is a positive integer N, N is smaller than or equal to M, and the same video content segment starts from an I-th audio frame in the second video, where I is a positive integer.

In an embodiment, the total number of audio frames of the first video may be a positive integer L, and the same video content segment starts from a J-th frame in the first video, where J is a positive integer. In the embodiment of the present disclosure, there is a special case in which the same video content segment is the entire content segment of the first video, for example, the total number of audio frames of the same video content segment is a positive integer N, and the total number of audio frames of the first video is also the positive integer N, at this time, the same video content segment starts from the I-th audio frame of the second video.

In consideration of step S100 of the above embodiment in which the association relationship may be acquired in four possible implementation manners, for the first implementation manner based on video content analysis, the positioning information may be recorded simultaneously when the same video content segment is acquired through analysis; for the second implementation manner of segmenting the video, the positioning information may also be recorded during video segmenting; for the third implementation manner of providing the association relationship by the operator and the fourth implementation manner of acquiring the association relationship through a video association relationship list, whether the positioning information is stored in the storage module may be determined according to actual conditions, and when it is determined that the positioning information is stored in the storage module, the positioning information may be acquired through means such as video analysis, and then stored. In an embodiment, the association relationship provided by the operator may be understood as an association relationship input by a user uploading a video, or may also be understood as an association relationship input by a background operator. In an embodiment, input time of the association relationship may be input when uploading the video, or the association relationship may be input later.

For step S130 in the above embodiment, when the positioning information is stored in the storage module, the video query response message sent in step S130 further includes:

the positioning information of the same video content segment in the first video; or positioning information of the same video content segment in the first video and in the second video.

In an embodiment, when a video is played on a terminal device, a playing progress of the video is interacted between an application server and the terminal device in real time, and for the case where the terminal device is playing the first video in this embodiment, a play control module on the application server may detect the playing progress of the first video. At this time, if the application server sends a video query request to the association relationship server, a video query response message including the identification information of the second video is acquired, if the positioning information is stored in the storage module, the positioning information may be sent to the application server; after acquiring the positioning information, the application server, which is capable of acquiring a current playing progress of the first video on the terminal device, may directly determine starting playing content of the second video according to the current playing progress of the first video and the positioning information, and then control the terminal device to start to play the second video from the starting playing content, so that continued playing is performed according to the current playing progress of the first video.

For example, if the length of the second video is 30 minutes, the length of the same video content segment is 2 minutes, and the same video content segment starts from the 15th minute of the second video, the length of the first video is 20 minutes, and the same video content segment starts from the 10th minute of the first video, when the application server detects that the first video is playing video content within the 11th minute, it can be determined that the same video content segment within the 1st minute is being played, and if continued playing is performed on the second video, the second video within the 16th minute should be played; that is, with starting time of the same video content segment in the first video and starting time of the same video content segment in the second video, the time from which the second video starts to be played may be deduced based on the currently played content of the first video. There is a special case in which when the same video content segment is the entire content segment of the first video, only the starting time of the same video content segment in the second video is acquired at this time; or when the same video content segment is the entire content segment of the second video, only the starting time of the same video content segment in the first video is acquired at this time, so that an accurate continued playing function in switching between the first video and the second video can be implemented. In other words, according to video content corresponding to the playing progress of the video before switching, the video content is used as starting playing content of the video after switching, and the video after switching is continuously played. The above description has been given by taking the positioning information as the timestamp information, but other positioning information, such as the video frame information and the audio frame information, is also applicable.

According to the present disclosure, not only the association relationship between the identification information of the first video and the identification information of the second video is stored in the storage module, but also the positioning information is stored in the storage module, for example, the positioning information of the same video content segment in the first video; or positioning information of the same video content segment in the second video; or the positioning information of the same video content segment in the first video and the positioning information of the same video content segment in the second video. When a query side device such as the application server initiates a query, the positioning information may be fed back to the query side device, so that, according to the positioning information and the playing progress of an associated video, the query side device may determine starting playing content of another associated video during continued playing, thereby implementing an accurate continued playing function.

In the embodiment of the present disclosure, since the playing progress of the video played by the terminal device may be acquired in real time on the play control module of the application server, in the mentioned-above embodiment, the query side device such as the application server sends a video query request message to the storage side device to acquire the associated video and the positioning information of the same video content segment in the associated video, then the query side device performs calculation to acquire the positioning information in the associated video corresponding to the playing progress of the played video, and based on the positioning information corresponding to the playing progress in the associated video, the starting playing content for the continued playing may be acquired.

In an implementation manner, in a case where the video query request message includes the identification information of the second video, the method further includes a step described below.

A playing progress of the first video, and corresponding positioning information of the same video content segment, corresponding to the playing progress of the first video, in the second video are acquired, where the video query response message includes the identification information of the second video associated with the identification information of the first video, and the corresponding positioning information of the same video content segment, corresponding to the playing progress of the first video, in the second video.

In a case where the video query request message includes the identification information of the second video, the method further includes a step described below.

A playing progress of the second video, and corresponding positioning information of the same video content segment, corresponding to the playing progress of the second video, in the first video are acquired, where the video query response message includes the identification information of the first video associated with the identification information of the second video, and the corresponding positioning information of the same video content segment, corresponding to the playing progress of the second video, in the first video.

In another implementation manner, in a case where the video query request message includes the identification information of the first video and a playing progress of the first video, the method further includes steps described below.

A storage side device, such as the association relationship server, according to the stored positioning information and the playing progress of the first video, acquires corresponding positioning information of the same video content segment, corresponding to the playing progress of the first video, in the second video, where the video query response message includes the identification information of the second video associated with the identification information of the first video, and the corresponding positioning information of the same video content segment, corresponding to the playing progress of the first video, in the second video, and feeds back to the application server.

In a case where the video query request message includes the identification information of the second video and a playing progress of the second video, the method further includes steps described below.

The storage side device, such as the association relationship server, according to the stored positioning information and the playing progress of the second video, acquires corresponding positioning information of the same video content segment, corresponding to the playing progress of the second video, in the first video, where the video query response message includes the identification information of the first video associated with the identification information of the second video, and the corresponding positioning information of the same video content segment, corresponding to the playing progress of the second video, in the first video.

In an embodiment, the query side device may also send the playing progress in the video query request message to the storage side device, so that the storage side device calculates, according to the playing progress and the positioning information of the same video content segment in the first video and/or the second video, the positioning information in the associated video corresponding to the playing progress of the played video, feeds back the positioning information through the video query response message, acquires the starting playing content during continued playing based on the positioning information corresponding to the playing progress in the associated video, and sends the starting playing content to the query side device through the video query response message, that is, the function of acquiring the starting playing content during continued playing by calculation may be set on the storage side device, the above content is only an example for describing that the module for calculating the starting playing content may be set on different servers or devices, which is not limited in the present disclosure.

In an embodiment, the same video content segment has a similarity value greater than a preset threshold.

In an embodiment, the same video content segment includes one of:
an entire content segment of the first video;
an entire content segment of the first video; or
a partial content segment of the first video, and a partial content segment of the second video.

Embodiment 3

Figure 3:
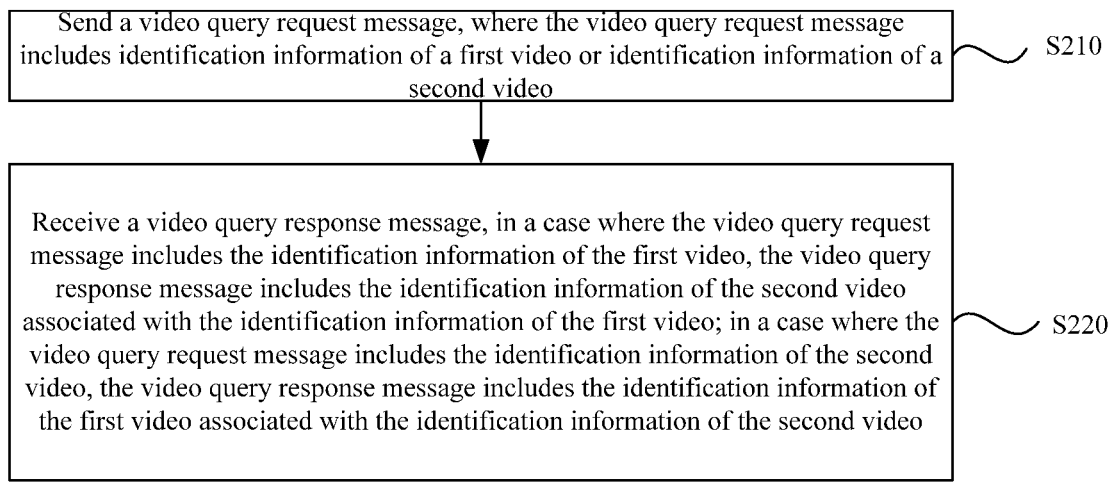
FIG. 3 is a flowchart of a method for querying information associated with video according to an embodiment of the present disclosure.

FIG. 3 is a flowchart of a method for querying information associated with video according to an embodiment of the present disclosure. The method is executed on a query side device, this embodiment is described by taking an application server as an example, and as shown in FIG. 3, the method includes steps S210 to S220.

In step S210, the application server sends a video query request message, where the video query request message includes identification information of a first video or identification information of a second video.

In an embodiment, the video query request may be sent to the association relationship server, so that the association relationship server acquires identification information of an associated video according to the stored association relationship.

In step S220, the application server receives a video query response message, where in a case where the video query request message includes the identification information of the first video, the video query response message includes the identification information of the second video associated with the identification information of the first video; in a case where the video query request message includes the identification information of the second video, the video query response message includes the identification information of the first video associated with the identification information of the second video, and the first video and the second video include a same video content segment.

According to this embodiment, the application server may query the association relation server for the identification information of the associated second video according to the identification information of the first video being currently played, or query the association relation server for the identification information of the associated first video according to the identification information of the second video being currently played. In an exemplary scenario, when controlling the terminal device to display the first video, the application server may prompt the user to play the second video associated with the first video; or when controlling the terminal device to play the second video, the application server may prompt the user to play the first video associated with the second video.

In an embodiment, the video query response message may further include positioning information of the same video content segment in the first video; or positioning information of the same video content segment in the second video; or the positioning information of the same video content segment in the first video and the positioning information of the same video content segment in the second video. In this way, on the premise that the application server acquires a playing progress of a video being played by the terminal device, continued playing of the content being currently played may be implemented according to the playing progress and the positioning information.

In the embodiment of the present disclosure, a scenario in which the terminal device is used as a query side device and the application server is used as a storage side device is applicable.

In an implementation manner of the scenario, based on the case where the video query request message includes the identification information of the first video, the video query response message includes the identification information of the second video associated with the identification information of the first video and corresponding positioning information of the same video content segment in the second video corresponding to a playing progress of the first video; and based on the case where the video query request message includes the identification information of the second video, the video query response message includes the identification information of the first video associated with the identification information of the second video and corresponding positioning information of the same video content segment in the first video corresponding to a playing progress of the second video.

In an embodiment, it can be understood that the video query request message sent by the terminal device to the application server may not carry the playing progress of the first video and/or the playing progress of the second video. The application server acquires the playing progress of the first video and/or the playing progress of the second video.

In the embodiment of the present disclosure, a scenario in which a play control module of the application server is used as the query side device, and a database module of the application server is used as the storage side device is also applicable. In the embodiment of the present disclosure, a scenario in which the application server is used as the query side device and the storage server and/or the association relationship server is used as the storage side device is also applicable.

In an implementation manner for the two scenarios, if the video query request message includes the identification information of the first video and the playing progress of the first video, the video query response message may further include the identification information of the second video associated with the identification information of the first video, and the positioning information of the same video content segment, corresponding to the playing progress of the first video, in the second video; or, if the video query request message includes the identification information of the second video and the playing progress of the second video, the video query response message includes the identification information of the first video associated with the identification information of the second video, and the corresponding positioning information of the same video content segment, corresponding to the playing progress of the second video, in the first video. The video query request message includes a playing progress of a video being currently played, and the storage side device such as the association relationship server calculates starting playing content of the video to be continuously played according to the playing information and the positioning information, and feeds back the starting playing content information to the query side device such as the application server through the video query response message.

In an embodiment, it can be understood that the video query request message sent by the application server to the storage server and/or the association server may carry the playing progress of the first video and/or the playing progress of the second video. The video query request message sent by the play control module of the application server to the database module of the application server may carry the playing progress of the first video and/or the playing progress of the second video.

Embodiment 4

Figure 4:
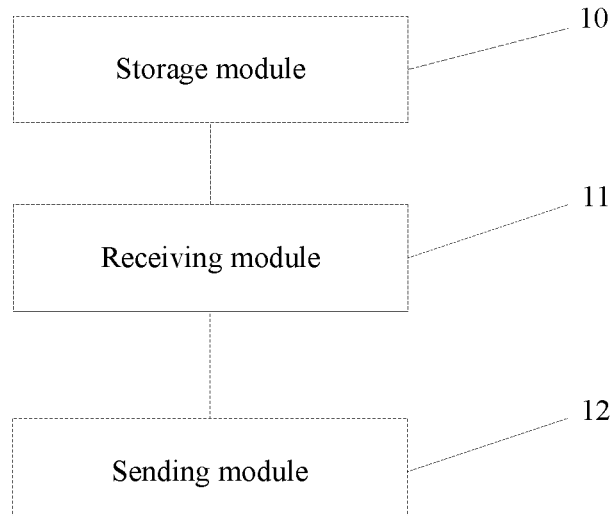
FIG. 4 is a structural diagram of an apparatus for processing information associated with video according to an embodiment of the present disclosure.

FIG. 4 is a structural diagram of an apparatus for processing information associated with video according to an embodiment of the present disclosure. The apparatus for processing information associated with video is equivalent to the storage side device described above, and may be a part of the association relationship server described in the above embodiment, or the database module of the application server, of which functional modules are capable of executing corresponding steps in the above embodiment, and the server includes a storage module 10, a receiving module 11 and a sending module 12.

The storage module 10 is configured to store an association relationship between identification information of a first video and identification information of a second video, where the first video and the second video include a same video content segment.

The receiving module 11 is configured to receive a video query request message, where the video query request message includes the identification information of the first video or the identification information of the second video.

The sending module 12 is configured to: in a case where the video query request message includes the identification information of the first video, acquire the identification information of the second video associated with the identification information of the first video, and return a video query response message including the identification information of the second video; or in a case where the video query request message includes the identification information of the second video, acquire the identification information of the first video associated with the identification information of the second video, and return a video query response message including the identification information of the first video.

Figure 5:
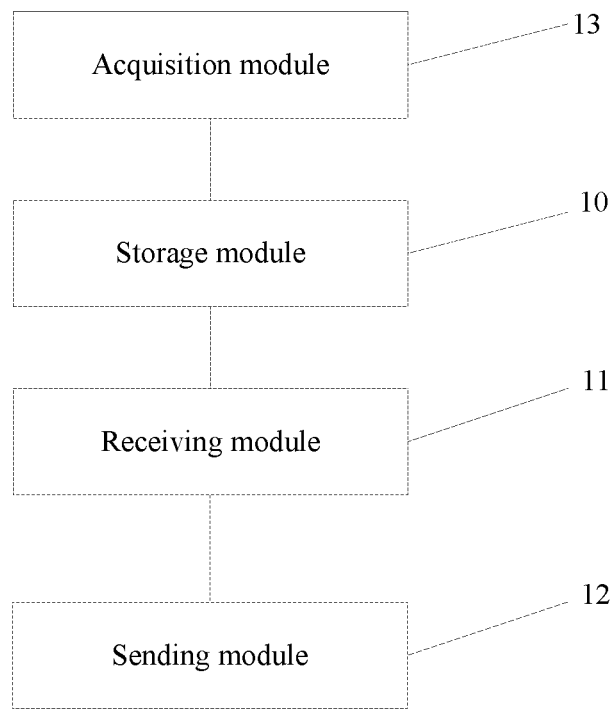
FIG. 5 is a structural diagram of another apparatus for processing information associated with video according to an embodiment of the present disclosure.

In an embodiment, in conjunction with FIG. 4, FIG. 5 is a structural diagram of another apparatus for processing information associated with video according to an embodiment of the present disclosure, and the apparatus further includes an acquisition module 13.

The acquisition module 13 is configured to acquire the association relationship between the identification information of the first video and the identification information of the second video before the association relationship between the identification information of the first video and the identification information of the second video is stored in the storage module 10.

The association relationship between the identification information of the first video and the identification information of the second video is acquired in at least one of following manners:

according to a video content analysis result of at least two videos, two videos including a same video content segment are taken as the first video and the second video respectively, and the association relationship between the identification information of the first video and the identification information of the second video is acquired;

the second video is segmented to acquire the first video through video segmentation, and the association relationship between the identification information of the first video and the identification information of the second video is acquired; or the association relationship between the identification information of the first video and the identification information of the second video is acquired through a video association relationship list, where the video association relationship list includes the association relationship between the identification information of the first video and the identification information of the second video.

In an embodiment, the same video content segment has a similarity value greater than a preset threshold.

The apparatus for processing information associated with video provided by the present disclosure can execute the method for processing information associated with video provided by the mentioned-above embodiment of the present disclosure, and has corresponding functional modules and effects of the execution method.

Embodiment 5

On the basis of the embodiment shown in FIG. 4 or FIG. 5, the storage module 10 is further configured to store the positioning information of the same video content segment in the first video; or, the storage module 10 is further configured to store the positioning information of the same video content segment in the second video; or, the storage module 10 is further configured to store the positioning information of the same video content segment in the first video and the positioning information of the same video content segment in the second video. The positioning information may be synchronously recorded when the association relationship is generated in step S100.

In an embodiment, the positioning information includes at least one of: timestamp information, video frame information, or audio frame information.

In an embodiment, the timestamp information includes reference time of the same video content segment in the first video and/or the second video, where the reference time may be starting time, ending time or another time point which can be used as a reference of the video; the video frame information includes a reference video frame of the same video content segment in the first video and/or the second video, where the reference video frame may be a starting video frame, an ending video frame or another video frame which can be used as a reference of video frames; the audio frame information includes a reference audio frame of the same video content segment in the first video and/or the second video, and the reference audio frame may be a starting audio frame, an ending audio frame, or another audio frame which can be used as a reference of audio frames.

In an embodiment, a video query response message sent by the sending module 12 further includes the positioning information of the same video content segment in the first video; or the positioning information of the same video content segment in the second video; or the positioning information of the same video content segment in the first video and the positioning information of the same video content segment in the second video. Correspondingly, a video query request message received by the receiving module 12 is further used for requesting the positioning information of the same video content segment in the first video; or the positioning information of the same video content segment in the second video; or the positioning information of the same video content segment in the first video and the positioning information of the same video content segment in the second video.

In an embodiment, based on a case where the video query request message includes the identification information of the first video, the acquisition module 13 is further configured to: acquire a playing progress of the first video, and corresponding positioning information of the same video content segment, corresponding to the playing progress of the first video, in the second video, where the video query response message includes the identification information of the second video associated with the identification information of the first video, and the corresponding positioning information of the same video content segment, corresponding to the playing progress of the first video, in the second video.

In an embodiment, based on a case where the video query request message includes the identification information of the second video, the acquisition module 13 is further configured to: acquire a playing progress of the second video, and corresponding positioning information of the same video content segment, corresponding to the playing progress of the second video, in the first video, where the video query response message includes the identification information of the first video associated with the identification information of the second video, and the corresponding positioning information of the same video content segment, corresponding to the playing progress of the second video, in the first video.

In an embodiment, if the video query request message includes the identification information of the first video and the playing progress of the first video, the acquisition module 13 is further configured to: acquire the corresponding positioning information of the same video content segment, corresponding to the playing progress of the first video, in the second video, where the video query response message includes the identification information of the second video associated with the identification information of the first video, and the corresponding positioning information of the same video content segment, corresponding to the playing progress of the first video, in the second video; or If the video query request message includes the identification information of the second video and the playing progress of the second video, the acquisition module 13 is further configured to acquire the corresponding positioning information of the same video content segment, corresponding to the playing progress of the second video, in the first video, and the video query response message includes the identification information of the first video associated with the identification information of the second video, and the corresponding positioning information of the same video content segment, corresponding to the playing progress of the second video, in the first video.

In an embodiment, the same video content segment is an entire content segment of the first video, or the same video content segment is an entire content segments of the second video, or the same video content segment is a partial content segment of the first video and the same video content segment is a partial content segment of the second video.

The apparatus for processing information associated with video provided by the present disclosure can execute the method for processing information associated with video provided by the mentioned-above embodiment of the present disclosure, and has corresponding functional modules and effects of the execution method.

Embodiment 6

Figure 6:
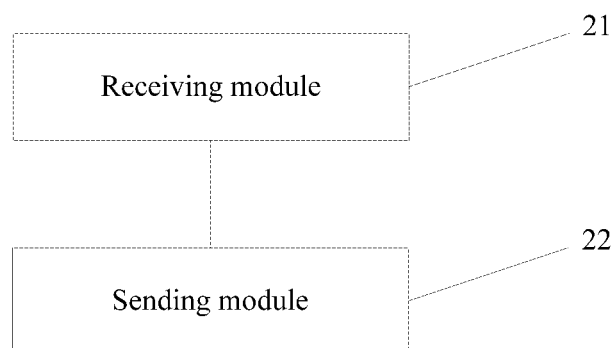
FIG. 6 is a structural diagram of an apparatus for querying information associated with video according to an embodiment of the present disclosure.

FIG. 6 is a structural diagram of an apparatus for querying information associated with video according to an embodiment of the present disclosure. The apparatus is a query side device described in the above embodiment, and it may be a part of an application server, or a part of a play control module of the application server. As shown in FIG. 6, the apparatus includes a sending module 21 and a receiving module 22. The sending module 21 is configured to send a video query request message, where the video query request message includes identification information of a first video or identification information of a second video. The receiving module 22 is configured to receive a video query response message, where in a case where the video query request message includes the identification information of the first video, the video query response message includes the identification information of the second video associated with the identification information of the first video, or in a case where the video query request message includes the identification information of the second video, the video query response message includes the identification information of the first video associated with the identification information of the second video, and the first video and the second video includes a same video content segment.

In an embodiment, the video query response message received by the receiving module 22 further includes positioning information of the same video content segment in the first video; or positioning information of the same video content segment in the second video; or the positioning information of the same video content segment in the first video and the positioning information of the same video content segment in the second video.

In an embodiment, based on the case where the video query request message includes the identification information of the first video, the video query response message includes the identification information of the second video associated with the identification information of the first video and positioning information corresponding to the same video content segment corresponding to a playing progress of the first video in the second video; and based on the case where the video query request message includes the identification information of the second video, the video query response message includes the identification information of the first video associated with the identification information of the second video and corresponding positioning information of the same video content segment corresponding to a playing progress of the second video in the first video.

In an embodiment, if the video query request message includes the identification information of the first video and the playing progress of the first video, the video query response message includes the identification information of the second video associated with the identification information of the first video, and the positioning information of the same video content segment, corresponding to the playing progress of the first video, in the second video; or, if the video query request message includes the identification information of the second video and the playing progress of the second video, the video query response message includes the identification information of the first video associated with the identification information of the second video, and the corresponding positioning information of the same video content segment, corresponding to the playing progress of the second video, in the first video.

The apparatus for querying information associated with video disclosed by the present disclosure can execute the method shown in FIG. 3, and has same effects.

The present disclosure further provides a system for querying information associated with video, and the system includes the apparatus for processing information associated with video as shown in FIG. 4 or FIG. 5, and the apparatus for querying information associated with video as shown in FIG. 6. In addition, in the above embodiment of the present disclosure, since a playing progress of a video played by the terminal device may be acquired in real time on the playing control module of the application server, in the above embodiment, a query side device such as the application server sends a video query request message to the storage side device to acquire an associated video and positioning information of the same video content segment in the associated video, and then the query side device performs calculation to acquire starting playing content during continued playing; in another implementation manner, the query side device may also send the playing progress in the video query request message to the storage side device, so that the storage side device calculates the starting playing content during continued playing according to the playing progress and the positioning information, and sends the starting playing content to the query side device through the video query response message, that is, a function of calculating and acquiring the starting playing content during continued playing may be set on the storage side device, the above content is only an example for describing that the module for calculating the starting playing content may be set on different servers or devices, which is not limited in the present disclosure.

Embodiment 7

Figure 7:
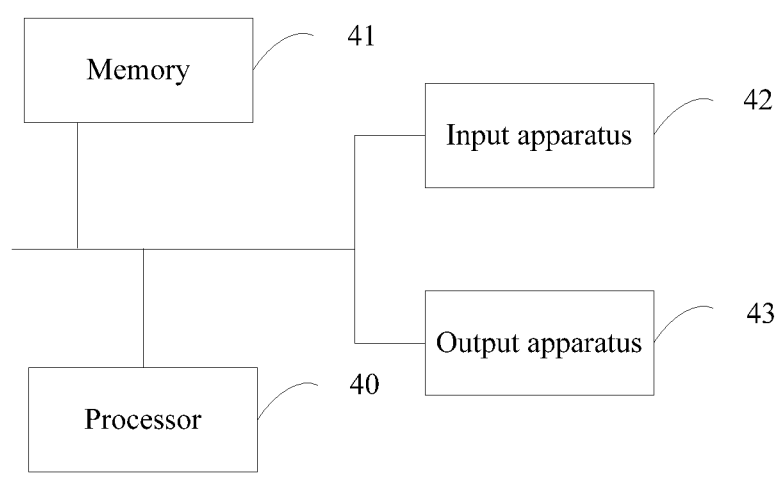
FIG. 7 is a structural diagram of an electronic device according to an embodiment of the present disclosure.

FIG. 7 is a structural diagram of an electronic device according to an embodiment of the present disclosure. As shown in FIG. 7, the electronic device includes a processor 40, a memory 41, an input apparatus 42 and an output apparatus 43. A number of processors 40 in the electronic device may be one or more, and one processor 40 is taken as an example in FIG. 7. The processor 40, the memory 41, the input apparatus 42 and the output apparatus 43 in the electronic device may be connected through a bus or in other ways. In FIG. 7, the connection through a bus is taken as an example. The bus represents one or more bus structures, including a memory bus or a memory controller, a peripheral bus, a graphics acceleration port, a processor, or a local area bus using any of various bus structures.

As a computer-readable storage medium, the memory 41 may be set to store software programs, computer-executable programs and modules, such as program instructions/modules corresponding to the method for processing information associated with video according to the embodiments of the present disclosure. The processor 40 runs the software programs, instructions and modules stored in the memory 41 to execute one or more function applications and data processing of the electronic device, that is, to implement the method for processing information associated with video described above.

The memory 41 may include a storage program area and a storage data area, where the storage program area may store an operating system, or an application program required for at least one function; the storage data area may store data or the like created according to the use of the terminal, such as the association relationship between the identification information of the first video and the identification information of the second video referred to in the above embodiments, and the positioning information of the same video content segment in the first video and/or the second video, and the like. Furthermore, the memory 41 may include a high-speed random access memory, and may also include a nonvolatile memory such as at least one disk memory, flash memory or another nonvolatile solid state memory. In some examples, the memory 41 may include memories which are remotely disposed relative to the processor and these remote memories may be connected to the electronic device via a network. Examples of the above network include, but are not limited to, the Internet, an intranet, a local area network, a mobile communication network and a combination thereof.

The input apparatus 42 may be configured to receive inputted digital or character information, and generate key signal input related to user settings and function control of the electronic device. The output apparatus 43 may include a display device such as a display screen.

In an embodiment, the electronic device may be a server or a terminal device.

Embodiment 8

The embodiments of the present disclosure further provide a computer-readable storage medium for storing a computer program, which, when executed by a processor, implements and/or a method for querying information associated with video provided by the embodiments of the present disclosure, and the method may be, but is not limited to, what is disclosed in the above embodiments.

The computer storage medium in the embodiments of the present disclosure may use any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. The computer-readable storage medium includes (a non-exhaustive list): an electrical connection having one or more wires, a portable computer disc, a hard disk, a Random Access Memory (RAM), a Read-Only Memory (ROM), an Erasable Programmable Read-Only Memory (EPROM), or a flash Memory, an optical fiber, a Compact Disc Read-Only Memory (CD-ROM), an optical storage device, a magnetic storage device, or any suitable combination of the foregoing. In the present disclosure, the computer-readable storage medium may be any tangible medium that can contain, or store a program. The program may be used by an instruction execution system, apparatus, or means or used in combination therewith.

The computer-readable signal medium may include a propagated data signal in baseband or as part of a carrier wave and carry computer-readable program code. The propagated data signal may use a variety of forms, which include, but are not limited to, an electro-magnetic signal, an optical signal, or any suitable combination thereof. The computer-readable signal medium also may be any computer-readable medium that is not a computer-readable storage medium and that can send, propagate, or transport a program for use by an instruction execution system, apparatus, or means or used in combination therewith.

Program code embodied on the computer-readable medium may be transmitted using any appropriate medium, including but not limited to wireless, wireline, optical fiber cable, Radio Frequency (RF), etc., or any suitable combination of the foregoing.

Computer program code for performing the operations of the present disclosure may be written in one or more programming languages, or in a combination thereof. The programming languages include an object oriented programming language such as Java, Smalltalk, C++, Ruby, Go, and also conventional procedural programming language, such as the "C" programming language or a similar programming language. The program code can be executed entirely on a user's computer, partly on the user's computer, as an independent software package, partly on the user's computer and partly on a remote computer, or entirely on a remote computer or a server. In cases involving the remote computer, the remote computer may be connected to the user's computer through any type of network, including a LAN or a wide area network (WAN), or may be connected to an external computer (such as, using an Internet service provider to connect through the Internet).

From the description of the embodiments described above, it will be apparent to those skilled in the art that the disclosure may be implemented by software and general-purpose hardware, or may be implemented by hardware. Based on this understanding, the embodiment provided by the present disclosure substantially, or the part contributing to the related art, may be embodied in the form of a software product. The software product is stored in a computer readable storage medium, such as a computer floppy disk, a ROM, a RAM, a flash, a hard disk or an optical disk, and includes several instructions for enabling a computer device (which may be a personal computer, a server or a network device) to execute the method according to one or more embodiments of the present disclosure.

It is to be noted that multiple units and modules included in the embodiment of the above mentioned apparatus are just divided according to functional logic, and the division is not limited to this, as long as the corresponding functions can be realized. In addition, the specific names of the each functional unit are just intended for distinguishing, and are not to limit the protection scope of the embodiments of the present disclosure.

What is claimed is:

1. A method for processing information associated with video, comprising:
    storing an association relationship between identification information of a first video and identification information of a second video, wherein the first video and the second video comprise a same video content segment;
    receiving a video query request message, wherein the video query request message comprises the identification information of the first video or the identification information of the second video; and in a case where the video query request message comprises the identification information of the first video, acquiring the identification information of the second video associated with the identification information of the first video, and returning a video query response message comprising the identification information of the second video; or in a case where the video query request message comprises the identification information of the second video, acquiring the identification information of the first video associated with the identification information of the second video, and returning a video query response message comprising the identification information of the first video.

2. The method of claim 1, wherein before storing the association relationship between the identification information of the first video and the identification information of the second video, the method further comprises:
acquiring the association relationship between the identification information of the first video and the identification information of the second video;
wherein the association relationship is acquired in at least one of following manners:
taking, according to a video content analysis result of at least two videos, two videos comprising a same video content segment as the first video and the second video respectively, and acquiring the association relationship between the identification information of the first video and the identification information of the second video;
segmenting the second video to acquire the first video through video segmentation, and acquiring the association relationship between the identification information of the first video and the identification information of the second video;
acquiring the association relationship between the identification information of the first video and the identification information of the second video; or
acquiring through a video association relationship list, wherein the video association relationship list comprises the association relationship between the identification information of the first video and the identification information of the second video.

3. The method of claim 1, further comprising at least one of:
storing positioning information of the same video content segment in the first video; or
storing positioning information of the same video content segment in the second video.

4. The method of claim 3, wherein the positioning information in the first video and the positioning information in the second video each comprise at least one of:
timestamp information, video frame information, or audio frame information.

5. The method of claim 4, wherein the timestamp information comprises at least one of: reference time of the same video content segment in the first video, or reference time of the same video content segment in the second video;
the video frame information comprises at least one of: a reference video frame of the same video content segment in the first video, or a reference video frame of the same video content segment in the second video; and
the audio frame information comprises at least one of: a reference audio frame of the same video content segment in the first video, or a reference audio frame of the same video content segment in the second video.

6. The method of claim 3, wherein the video query response message further comprises at least one of:

the positioning information of the same video content segment in the first video; or
the positioning information of the same video content segment in the second video.

7. The method of claim 3, in a case where the video query request message comprises the identification information of the first video, the method further comprises:
acquiring a playing progress of the first video, and acquiring corresponding positioning information of the same video content segment, corresponding to the playing progress of the first video, in the second video, wherein the video query response message comprises the identification information of the second video associated with the identification information of the first video, and the corresponding positioning information of the same video content segment, corresponding to the playing progress of the first video, in the second video; or
in a case where the video query request message comprises the identification information of the second video, the method further comprising:
acquiring a playing progress of the second video, and acquiring corresponding positioning information of the same video content segment, corresponding to the playing progress of the second video, in the first video, wherein the video query response message comprises the identification information of the first video associated with the identification information of the second video, and the corresponding positioning information of the same video content segment, corresponding to the playing progress of the second video, in the first video.

8. The method of claim 3, wherein in a case where the video query request message comprises the identification information of the first video and a playing progress of the first video, the method further comprises:
acquiring corresponding positioning information of the same video content segment, corresponding to the playing progress of the first video, in the second video, wherein the video query response message comprises the identification information of the second video associated with the identification information of the first video, and the corresponding positioning information of the same video content segment, corresponding to the playing progress of the first video, in the second video; or
in a case where the video query request message comprises the identification information of the second video and a playing progress of the second video, the method further comprising:
acquiring corresponding positioning information of the same video content segment, corresponding to the playing progress of the second video, in the first video, wherein the video query response message comprises the identification information of the first video associated with the identification information of the second video, and the corresponding positioning information of the same video content segment, corresponding to the playing progress of the second video, in the first video.

9. The method of claim 1, wherein the same video content segment has a similarity value greater than a preset threshold.

10. The method of claim 8, wherein the same video content segment comprises one of:
an entire content segment of the first video;
an entire content segment of the first video; or a partial content segment of the first video, and a partial content segment of the second video.

11. A method for querying information associated with video comprising:
sending a video query request message, wherein the video query request message comprises identification information of a first video or identification information of a second video; and
receiving a video query response message;
wherein in a case where the video query request message comprises the identification information of the first video, the video query response message comprises the identification information of the second video associated with the identification information of the first video;
or in a case where the video query request message comprises the identification information of the second video, the video query response message comprises the identification information of the first video associated with the identification information of the second video, and the first video and the second video comprise a same video content segment.

12. The method of claim 11, wherein the video query response message further comprises at least one of:
positioning information of the same video content segment in the first video; or
positioning information of the same video content segment in the second video.

13. The method of claim 12, wherein
based on the case where the video query request message comprises the identification information of the first video, the video query response message comprises the identification information of the second video associated with the identification information of the first video, and corresponding positioning information of the same video content segment, corresponding to a playing progress of the first video, in the second video; or
based on the case where the video query request message comprises the identification information of the second video, the video query response message comprises the identification information of the first video associated with the identification information of the second video, and corresponding positioning information of the same video content segment, corresponding to a playing progress of the second video, in the first video.

14. The method of claim 12, wherein
based on a case where the video query request message comprises the identification information of the first video and a playing progress of the first video, the video query response message comprises the identification information of the second video associated with the identification information of the first video, and corresponding positioning information of the same video content segment, corresponding to the playing progress of the first video, in the second video; or
based on a case where the video query request message comprises the identification information of the second video and a playing progress of the second video, the video query response message comprises the identification information of the first video associated with the identification information of the second video, and corresponding positioning information of the same video content segment, corresponding to the playing progress of the second video, in the first video.

15. An electronic device, comprising:
at least one processor; and
a memory, which is configured to store at least one program;
wherein the at least one program, when executed by the at least one processor, causes the at least one processor to implement a method for processing information associated with video, comprising:
storing an association relationship between identification information of a first video and identification information of a second video, wherein the first video and the second video comprise a same video content segment;
receiving a video query request message, wherein the video query request message comprises the identification information of the first video or the identification information of the second video; and
in a case where the video query request message comprises the identification information of the first video, acquiring the identification information of the second video associated with the identification information of the first video, and returning a video query response message comprising the identification information of the second video; or in a case where the video query request message comprises the identification information of the second video, acquiring the identification information of the first video associated with the identification information of the second video, and returning a video query response message comprising the identification information of the first video.

16. A non-transitory computer-readable storage medium for storing a computer program, which, when executed by a processor, implements the method for processing information associated with video of claim 1.

17. The method of claim 7, wherein the same video content segment comprises one of:
an entire content segment of the first video;
an entire content segment of the first video; or
a partial content segment of the first video, and a partial content segment of the second video.

18. The method of claim 8, wherein the same video content segment comprises one of:
an entire content segment of the first video;
an entire content segment of the first video; or
a partial content segment of the first video, and a partial content segment of the second video.

19. An electronic device, comprising:
at least one processor; and
a memory, which is configured to store at least one program;
wherein the at least one program, when executed by the at least one processor, causes the at least one processor to implement the method for querying information associated with video of claim 11.

20. A non-transitory computer-readable storage medium for storing a computer program, which, when executed by a processor, implements the method for querying information associated with video of claim 11.

* * * * *